May 19, 1964 K. A. RIEDEL 3,133,349
TOOL CHANGER FOR A MACHINE TOOL
Filed July 24, 1961 6 Sheets-Sheet 1

FIG. 1

INVENTOR.
KURT A. RIEDEL
BY
ATTORNEY

FIG. 2

INVENTOR.
KURT A. RIEDEL

May 19, 1964  K. A. RIEDEL  3,133,349
TOOL CHANGER FOR A MACHINE TOOL
Filed July 24, 1961  6 Sheets-Sheet 3

INVENTOR.
KURT A. RIEDEL
BY William C. Gleisner Jr.
ATTORNEY

FIG. 10

INVENTOR.
KURT A. RIEDEL
BY William C. Gleisner Jr.
ATTORNEY

FIG. 11

United States Patent Office 3,133,349
Patented May 19, 1964

3,133,349
TOOL CHANGER FOR A MACHINE TOOL
Kurt A. Riedel, Milwaukee, Wis., assignor to Kearney & Trecker Corporation, West Allis, Wis., a corporation of Wisconsin
Filed July 24, 1961, Ser. No. 126,093
15 Claims. (Cl. 29—568)

This invention relates to tool changers in general and more particularly to an improved tool changer for a machine tool.

It is therefore a general object of the present invention to provide an improved tool change mechanism for a machine tool.

Another object of the present invention is to provide an improved tool change mechanism of the breech loading type.

Another object of the present invention is to provide a tool spindle adapted to be loaded from the rearward end.

Another object of the invention is to provide a tool spindle with compound pistons for effecting relative movement to effect a change of tools.

Another object is to provide a machine tool spindle having an element operative to transfer a tool from a storage section to an operating position.

Another object is to provide a tool storage magazine that is adjustable both axially and rotatably for loading a tool spindle through its rearward end in a manner that the tools are stored in an area remote from the operating station.

Another object of the invention is to provide a tool spindle in which a tool is loaded into the spindle in an operative position from the rear end.

Another object is to provide an adjustable tool change mechanism cooperatively adjustable with a tool storage magazine for effecting a change of tools through the rearward end of the spindle.

Another object of the present invention is to provide a tool spindle that is axially adjustable for loading and unloading a tool as well as for positioning the tool relative to the workpiece.

Another object of the invention is to provide an auxiliary tool change member operable with a tool change member carried by the spindle head for loading and unloading a tool in a tool spindle wherein a tool storage magazine is rotatably adjustable.

Another object of the present invention is to provide a rotatably adjustable tool storage magazine with a tool changing mechanism adapted to load a tool spindle from the rearward end.

Another object of the invention is to provide a tool changer adapted to receive a tool in operative position through a rearward opening in the tool spindle.

According to this invention, a machine tool is provided with an automatic tool changer of the rearward loading type. In this type of tool change mechanism the tool spindle is constructed with a hollow opening extending throughout its entire length and carries a tool change mechanism therein. The tool change mechanism, in turn, is connected with hydraulically operated power actuators for providing axial movement of the changer relative to the base of the machine tool. The tools to be used in machining operations are carried by a drum or magazine mounted on the machine tool frame. The drum is adjustable both axially and rotatably for combined operation with the spindle head. The coordinated movements of the drum and of the tool changer, including the tool spindle, combines to effect a change of tools in the spindle through the rearward end of the spindle head. The procedure for changing a tool in the tool spindle is initiated by effecting axial movement of both the spindle head and the tool changer contained therein to an unload position which simultaneously positions and locks the tool in the storage magazine. The magazine is then elevated until there is sufficient clearance for the tools to pass the tool changer, and the storage magazine is then rotated to bring a newly selected tool into proper position for subsequent insertion into the spindle. When the selected tool is in the proper position, the drum is lowered inserting the tool into the spindle through its rearward end. After the tool is positioned in the spindle, a subsequent action of the tool changer locks the tool into position and the spindle head is ready to be positioned for a machining operation. During machining, the magazine remains in lowered position with an empty socket aligned to receive the tool being used. Upon completion of a machining operation, the tool changer and spindle head are moved axially toward the drum to initiate the next tool change cycle.

A modification of this invention provides a structure wherein an auxiliary tool change mechanism is mounted in operative relationship with the storage drum and the tool changer carried within the spindle head to transfer the tool from the storage drum to the tool spindle.

Thus, in either case, a tool is inserted into the tool spindle from the rearward end, and, after a machining operation, withdrawn from the rearward end and stored in the tool storage drum or magazine.

The foregoing and other objects of the invention which will become more fully apparent from the following description of mechanisms and integrated electro-hydraulic system embodying a further embodiment thereof, may be achieved by the embodying apparatus described herein in connection with the accompanying drawings, in which.

Figure 1:
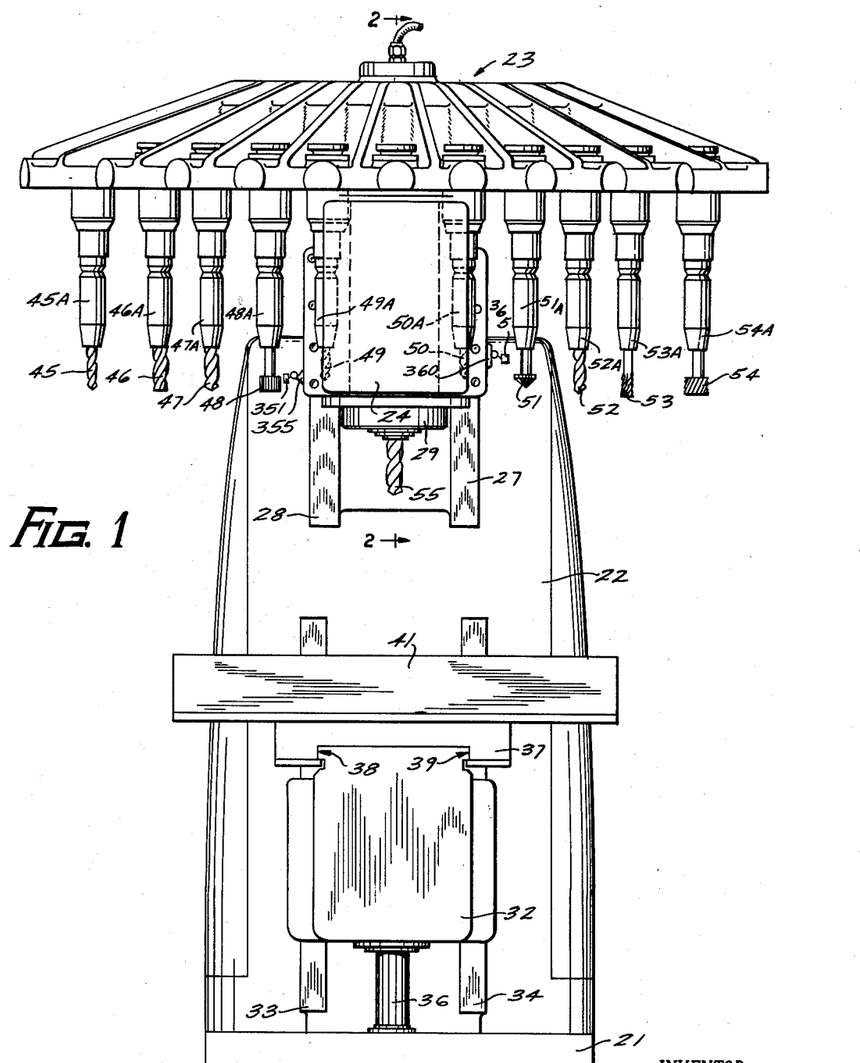
FIGURE 1 is a general view in front elevation of a milling machine embodying the present invention.

Referring now to the drawings and more particularly to FIG. 1 thereof, a machine tool is provided embodying the present invention. The machine tool includes a base 21 and a vertically upstanding column 22 that carries on its upper portion a tool storage drum or tool storage magazine 23 that is both axially and rotatably movable. On its upper forward portion, the column 22 carries a vertically movable spindle head 24 that is slidable on way surfaces 27 and 28 formed on the column 22. Cooperating way surfaces integrally formed with the spindle head 24 slide on the way surfaces 27 and 28. The spindle head 24 houses an adjustable drive spindle 29 shown in detail in FIG. 2.

At the lower end of the column 22, a knee 32 is slidably supported for vertical movement on way surfaces 33 and 34 and is vertically adjustable by means of the usual screw and nut mechanism (not shown) encased in a telescoping housing 36. A saddle 37 is slidably supported on way surfaces 38 and 39 for transverse horizontal movement relative to the knee 32 and the column 22, and a worktable 41 is slidably supported on way surfaces 42 for longitudinal movement.

Figure 2:
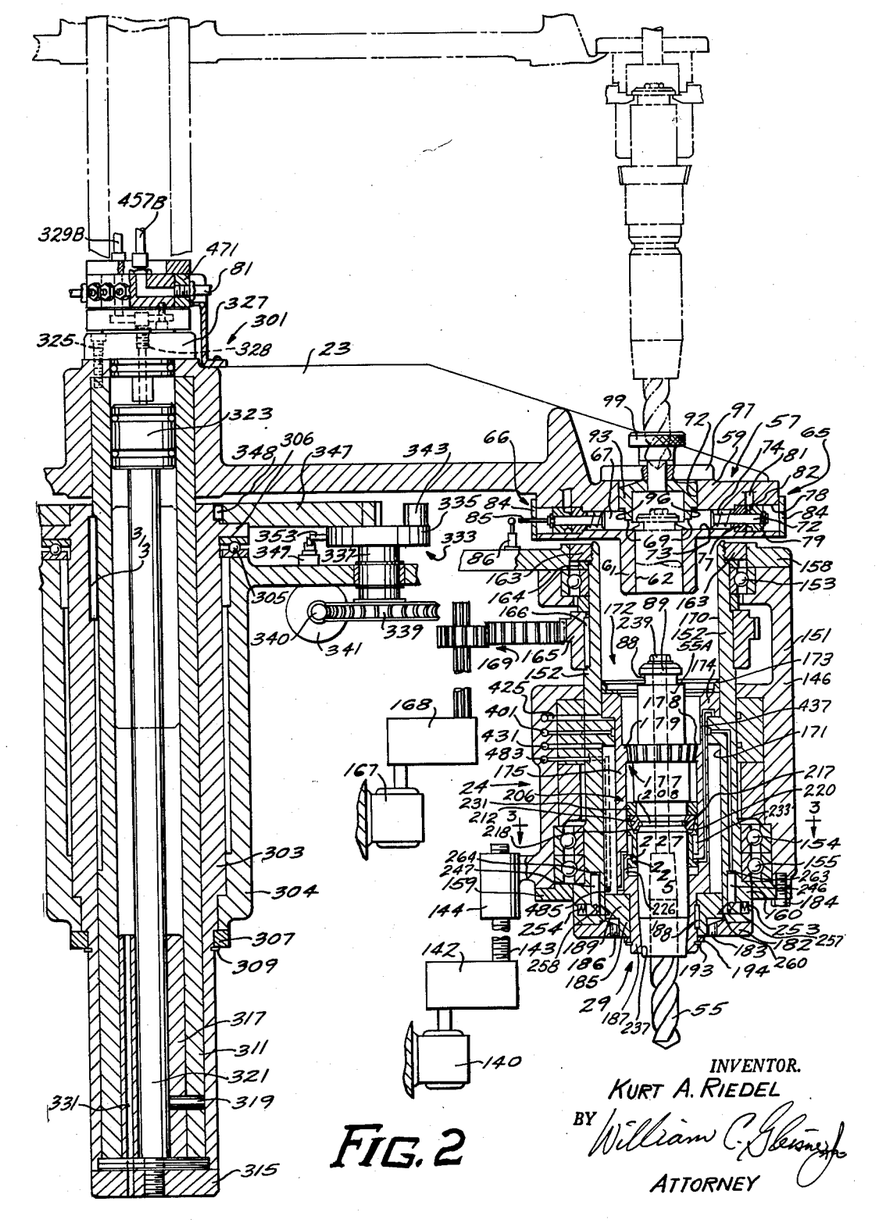
FIG. 2 is a view in vertical section of the spindle head taken along the lines 2—2 in FIG. 1.

The tool storage magazine or drum 23 carried at the top of the column 22 is adapted to hold a plurality of peripherally spaced cutting tools such, for example, cutting tools 45 to 54 inclusive shown in FIG. 1. Each of the tools 45 to 54 is secured within an associated tool holder 45a to 54a, the latter being releasably carried by the magazine 23 for selective insertion into the tool spindle. As further represented in FIG. 1, a tool 55 is operatively carried by the spindle with the magazine lowered into abutting engagement with the upper face of the spindle head. Thus, an empty storage socket, as shown in FIG. 2, is positioned to receive the tool 55. To simplify the description, the term tool is deemed to identify both a cutting tool (45 to 54) and an associated tool holder 45a to 54a. Referring more particularly to FIG. 2 of the drawings, a tool such as tool 55, is held in the storage drum 23 by means of a hydraulically releasable holding mechanism generally identified by reference numeral 57. The tool holding mechanism 57 is carried in the periphery of the drum 23 and is adapted to be operated manually as well as hydraulically. Since each tool holding mechanism 57 is identical, it is deemed sufficient to describe only one such device. For the sake of clarity in the description, the tool carrier portion of the drum 23 that supports the tool holders with the tools is designated by reference numeral 59. Each tool carrier portion 59 is provided with a depending portion 61 integrally formed therewith and having a vertically bored opening or socket 62 disposed in parallelism with the axis of spindle rotation. Each socket is of such size as to receive the upper portion of a tool, such as the tool 55 latched within the bore or socket 62, in phantom lines in FIG. 2.

To retain the toolholder 55A in a stored condition in the tool holding mechanism 57, two spring loaded locks 65, 66 are provided in the carrier portion 59 for each tool. Since the locks associated with all of the storage sockets are identical, it is deemed sufficient to describe only one of them. Each lock comprises a latch 67 having shoulders 69, and a tapered surface formed on one end, with the opposite end secured to a piston rod 72. The latch 67 is slidably carried within a bore 73 and is urged radially inward to a locking position by means of a spring 74 that abuts with one end against the latch 67 and with its opposite end against a tubular plug 77 secured in a bore 78 formed in the carrier portion 59. A piston 79 is slidably carried within the bore 78, and is secured to one end of the piston rod 72. The latch 67 is displaced radially outward to an unlocked position by means of hydraulic pressure fluid which is supplied from a hydraulic line 81 to a chamber 82 formed between the piston 79 and the plug 77. An O ring (not shown) encircles the piston 79, in a well known manner, to prevent the leakage of pressure fluid past the piston. Movement of the piston 79 to the unlocked or unlatched position is limited by a cover plate 84 secured to the carrier portion 59 in a manner to close the bore 78. A breather hole is provided in the cover plate 84 to vent the head side of the piston 79. The piston rod of the inner lock 66 is provided with an extension rod 85 extending through the hole in the cover plate 84 and actuates a limit switch 86 when the lock 66 is moved to an unlock position.

The latch 67 of the lock is spring biased to an inward position in its normal condition. In this manner, it is adapted to retain a toolholder in the locating socket 62 of the storage drum 23. As illustrated in FIG. 2, the upper portion of the tool holder 55A is provided with an annular groove 88 which is adapted to receive the forward tapered ends of the latches 67 provided with shoulders 69 and tapered surfaces. As the toolholder is inserted in the locating socket 62 the latches of the locks 65 and 66 extend into the annular groove 88 thereby locking the toolholder within the locating socket. Thus, it will be apparent that to release the tool when in an automatic mode of operation, hydraulic pressure is transmitted to the locks 65, 66 moving the latches 67 radially outward out of the annular groove 88. When hydraulic pressure fluid to the pistons is terminated, the latches are returned to their normally inward position by the springs 74. It should be noted that when the latches are in the inward or locking position, a toolholder can be inserted manually into the locating socket and held in position. As the tool is inserted into the locating socket 62, either manually or in automatic mode of operation, the beveled upper end 89 engages the latches 67 moving them radially outwardly. Continued upward movement of the toolholder 55A will position the annular groove 88 so that the latches 67 are biased inwardly into the annular groove and lock the toolholder 55A in position.

In addition to actuating the locks hydraulically to release a tool, manual means are provided for releasing a tool. To manually displace the latches 67 radially to an unlocking position, a cam member 93 is rotatably carried in a bored opening 92 formed in the carrier 59 and retained therein by a plate 97 secured to the carrier portion 59. The cam member 93 is provided with a depending elliptically formed cam 96 engaging the shoulders 69 of the latches 67, and is secured to a knurled knob 99 for selective manual rotation. Rotation of the cam member 93 displaces the latches 67 radially outward by positioning the enlarged portion of the elliptical cam in contact with the shoulder 69 in the latches 67. With the reduced portion of the cam in contact with the shoulders 69, the latches 67 are displaced inwardly, the cam then functioning as a stop member to limit the radial inward movement of the latches.

The tools carried by the storage drum 23 are selectively positioned in axial alignment above the drive spindle 29 preparatory to insertion therein. As shown in FIG. 2, the drive spindle 29 is constructed to have a tool inserted therein from the rearward end. The drive spindle 29 is carried by the spindle head 24 in operative relationship below the magazine 23, as illustrated in FIGS. 1 and 2. A feed motor 140 is connected to drive the spindle head 24 for vertical movement through a transmission 142 having a rotatable feed screw 143. The output screw 143 is threaded into a cooperative nut 144 secured to a housing 146 integrally formed with the spindle head 24.

The housing 146 carries the drive spindle 29 which comprises a tubular sleeve 152 rotatably mounted in bearings 153, 154 and 155 mounted in the housing 146. The bearing 153 is held in position by a bearing retainer ring 158 secured to the top of the housing 146, and the bearings 154 and 155 are held in position by a bearing retainer ring 159 secured to the bottom of the housing 146 by means of threaded bolts 184. The lower portion of the spindle sleeve 152 is provided with an annular flange 160 integrally formed therewith in a manner to bear against the inner race of the bearing 155. To securely hold the spindle drive sleeve 152 against axial movement within the bearings 153, 154 and 155, a spindle take up nut 163 threadedly engages the upper end of the drive sleeve 152 in a manner to bear against a spacer ring 164 which in turn bears against the inner race of the bearing 153. The spindle drive sleeve 152 is driven by a spindle drive gear 165 which is secured to the drive sleeve by a key 166. A spindle motor 167 drives the gear 165 through a transmission 168 and a gear train 169.

The spindle drive sleeve 152 is provided with cylinders 170, 171 which slidably carry a tool change member generally identified by the reference numeral 172, that moves axially for raising and lowering a tool holder and its associated tool. A seal or shield 173 is carried by the top of the tool change member 172, as shown in FIG. 2, and serves to clean the cylindrical bore 170 during upward movement. It will be noted that the cylindrical bore 170 is opened at its upper end and therefore susceptible to having foreign material enter and collect in the cylinder. The tool change member 172 comprises a piston 174 slidably carried within the cylinder 170 and integrally formed with a hollow sleeve 175 of reduced diameter which extends downwardly from the piston 174. At the upper end of the sleeve 175 an internal flange 177 is provided having serrations 178 intermeshing with serrations 179 formed on an annular ring 181 of the toolholder 55A to form the driving connection from the sleeve 175 to the toolholder 55A.

The driving connection from the tubular spindle 152 to the sleeve 175 is located at the lower end of the sleeve 175. As illustrated in FIG. 2, an internal gear 182 having gear teeth 183 is secured to the lower end of the spindle drive sleeve 152 by any suitable well known means such as threaded bolts (not shown). A ring gear 185 provided with teeth 186 is operably connected to the sleeve 175 by means of a key 188. A piston 189 is integrally formed with the gear 185 and is slidably carried within the cylinder 171 formed in the tubular spindle 152. The gear 185 and the piston 189 are retained on the lower flanged portion of the tool changer sleeve 175 by means of a snap ring 193, with a fitting washer 194 interposed therebetween. It will be apparent that the upper piston 174, sleeve 175, tool guide sleeve 187 and lower piston 189 comprise the tool change member 172, and constitute a unitary structure constrained for axial slidable movement within the tubular spindle.

Figures 3, 4, 5, 9:
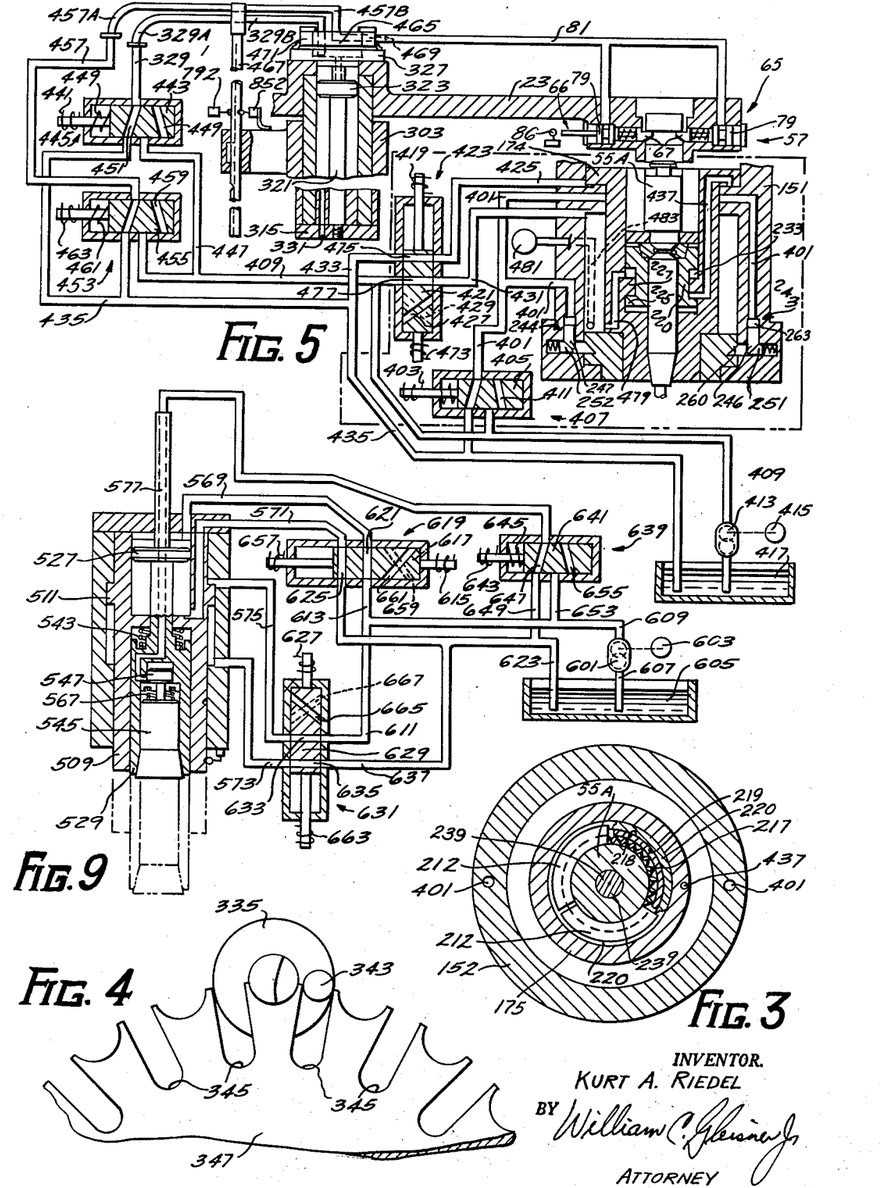
FIG. 3 is a cross sectional view through the drive spindle taken along the lines 3—3 in FIG. 2.
FIG. 4 is a plan view partly in section of the Geneva index mechanism.
FIG. 5 is a schematic view of the hydraulic circuit used in connection with the embodiment illustrated in FIG. 2.
FIG. 9 is a schematic view of a hydraulic circuit used in connection with the modified view in FIG. 6.

The tool holder 55A is held within the sleeve 175 in operative position by means of a clamping mechanism generally identified by the reference numeral 206. The upper portion of the toolholder 55A, is provided with a V shaped groove 208 presenting diverging tapered surfaces, engaged by complementary inner tapered surfaces formed in the respective arcuate segments of an expansible clamp ring 212. In actual construction the toolholder clamp ring 212 comprises a plurality of arcuate segments or sections that are biased outwardly by means of a spring ring 217 as best shown in FIG. 3. It will be apparent that the clamp ring 212 must be made in sections in order for it to move radially to engage and disengage the groove 208 for clamping the toolholder 55A in the changer element 172. On its external periphery, the toolholder clamp ring 212 is provided with a tapered surface 218. As indicated in FIG. 3, the tapered surface 218 is slidably engaged by a cooperating conically disposed cam surface 219 formed on the upper inner end of an axially movable clamp actuator 220. The clamp actuator 220 comprises a sleeve and a lower piston 225. The piston 225 and sleeve 226 are slidably carried for axial movement within a cylindrical opening relative to an annular internal flange 227 integrally formed with the sleeve 226. Upward movement of the actuator 220 effects inward radial movement of the toolholder clamp ring 212 by means of the slidably engaged tapered surfaces. Further, the toolholder clamp ring 212 is guided in its radial movement by means of a thrust ring 231 that is disposed on a reduced portion of the holder 55A in abutting relationship with the segments of the toolholder clamp ring 212 and located within a lower bore 230 of the sleeve 175. Upward movement of the actuator 220 is effected by means of hydraulic pressure fluid which is transmitted to a cylindrical chamber 233. Downward axial movement of the piston 225 is effected by admitting hydraulic pressure fluid into a chamber formed below the annular flange 227. When the clamp actuator 220 is moved downwardly, the spring 217 moves the toolholder clamp ring 212 radially outward thereby releasing its grip on the toolholder 55A. The various cooperatively disposed parts for retaining a tool in operating position are represented schematically to simplify the description.

As hereinbefore described, upward movement of the clamp ring actuator 220 moves the toolholder clamp ring 212 radially inward to engage the groove 208. This action effects downward movement of the toolholder into tool clamping engagement. The lower end of the toolholder is provided with a cylindrical taper 237 which slidably engages an internal cooperating taper formed in the lower end of the tool guide sleeve 187. A draw bolt 239 extending thru a bored opening in the toolholder 55A threadedly engages one end of the cutting tool 55.

To retain the gears 182 and 185 engaged position and the tool 55 in the downward operating position, hydraulically releasable spring biased locks 243 and 244 are provided in the spindle drive sleeve 152. Each of the locks 243 and 244, as depicted in FIG. 5, include vertically movable hydraulically actuated pistons 246 and 247 respectively presenting lower tapered ends. Also forming part of the locks 243 and 244 are horizontally disposed members 251 and 252 which are spring biased inwardly by means of springs 253 and 254 respectively, identified in FIG. 2. The horizontal members 251 and 252 are likewise provided with tapered surfaces 257 and 258 respectively. When the lock members 251 and 252 are urged inwardly under the influence of the springs 253 and 254, they engage a groove 260 formed in the periphery of the piston 189. To release members 251 and 252 from locking engagement with the groove 260, hydraulic pressure fluid is supplied to chambers 263 and 264 to effect downward movement of the pistons 246 and 247 respectively. The tapered surface of the piston 246 engages the tapered surface 257 of the horizontal member 251 thereby urging the member 251 outwardly to unlocked position. Likewise, the tapered surface of the piston 247 slidably engages the tapered surface 258 of the horizontal member 252 thereby urging the member 252 outwardly radially to an unlocked position. The members 251 and 252 will return to their radially inward locking position upon releasing the hydraulic pressure fluid from the chambers 263 and 264. The tool storage magazine 23 is raised and lowered axially by means of a hydraulic power actuator 301 connected to both the column 22 and the magazine 23. The power actuator 301 is rotatably supported in the column 22 by means of a bearing sleeve 303 journalled in a tubular support 304 having its upper end supported by a bearing 305, the bearing being supported by the column 22. To hold the bearing sleeve 303 against axial movement, the upper end of the sleeve 303 is provided with a flange 306 abutting the one race of the bearing 305. A spacer 307, abutting the column 22, is held in axially fixed position by a snap ring 309 at the lower end of the sleeve 303. With this arrangement, it will be apparent that the sleeve 303 is rotatably movable but not axially movable.

The power actuator 301 comprises a cylinder 311 keyed to the bearing sleeve 303 by means of a key 313 and is axially movable therein. The lower end of the bearing sleeve 303 is provided with an end plate 315 to limit the downward movement of the cylinder 311. The lower end of the cylinder 311 is pinned to a sleeve 317 by a pin 319. The sleeve 317 slidably engages a piston rod 321 having one end fixedly secured to the end plate 315 and the opposite end secured to a stationary piston 323. The upper end of the cylinder 311 is secured to the drum 23 by means of bolts 325. In addition, the bolts 325 also secure an end plate 327 having a port 328 to the magazine 23. From this description, it will be apparent that by supplying hydraulic pressure fluid to the power actuator 301 via the port 328, the magazine 23 will be elevated until the sleeve 317 abuts the lower end of the piston 323. A breather line 331 is provided in the sleeve 317 and the end plate 315 to relieve pressure on the rod side of the stationary piston 323.

To rotatably index the magazine or drum 23 after it has been elevated to an upper position, a Geneva index mechanism 333 is provided, as illustrated in FIGS. 2 and 4. The Geneva index mechanism 333 comprises an index locater plate 335 secured to a shaft 337 that is driven by a worm gear 339. The worm gear 339 is driven by a worm 340 connected to be driven by an electric motor 341, shown in FIG. 2. The shaft 337 is rotatably mounted in the column 22. An index crank pin 343 is secured to the index locater plate 335 and is adapted to enter radial grooves 345 formed in a driven plate 347 which is adapted to cooperate with the index locater plate 335. Since a Geneva index mechanism is a well known mechanism it is not deemed necessary to describe it in detail. The driven index plate 347 is secured to the bearing sleeve 303 by a key 348 and rotates the drum 23 upon being driven by the index locater plate 335 and index crank pin 343.

To control the rotary movement of the drum 23 and the vertical movement of the spindle head 24, two limit switches 349 in FIG. 2 and 351, FIG. 1, are secured to column 22. A dog 353 located in the index locater plate 335, FIG. 2, as well as a dog 355, FIG. 1, carried by the spindle head 24 respectively actuate the switches 349 and 351 to terminate movement of the respective members. The switches 349 and 351 are interconnected in the electrical circuit shown in FIG. 8 and their control functions will be described in greater detail hereinafter.

The hydraulic circuit for the invention disclosed herein will now be more fully described with reference to the tool change mechanism shown in FIG. 2. As a starting point, assume that a machining operation has just been completed by the cutting tool 55, and that the spindle head is located at some point other than its extreme upward or "home" position, as shown in FIG. 2. Assume further, that in order to proceed with the machining operation, a different tool is necessary for performing a subsequent operation. Therefore, the tool 55 which is now in the spindle must be replaced by a tool carried by the storage drum 23. Prior to effecting a tool change, the spindle head 24 must be raised to its upper unload position as shown in FIG. 2. The spindle head 24 is raised to the unload position by means of the nut 144 and screw 143 drive which is driven by the electric motor 140, shown in FIG. 2.

As the spindle head moves upwardly approaching its upper limit of travel, a dog 360 secured to the spindle head 24 actuates a limit switch 365 secured to the column 22, shown in FIG. 1. Actuation of the switch 365 is preparatory to the tool change cycle by releasing the locks 243 and 244 which engage the groove 260 locking the piston 189 in a lower position in the drive sleeve 152. The locks 243 and 244 are released by hydraulic pressure fluid being admitted into the chambers 263 and 264 via a conduit 401. A solenoid 403 connected to a valve spool 405 of a solenoid valve 407 is energized placing the conduit 401 in communication with a main supply line 409 via a line 411 in the valve spool 405. A hydraulic pump 413 driven by an electric motor 415 withdraws hydraulic fluid from a sump 417 and discharges into the main supply line 409. As hydraulic pressure fluid enters the chambers 263 and 264, FIGS. 2 and 5, the pistons 246 and 247 are urged downwardly moving the horizontal members 251 and 252 radially outward, disengaging them from the groove 260 and permitting the tool change member 172, including the piston 189 to move upwardly.

As the spindle head 24 reaches its upper limit of travel, the dog 355 actuates the limit switch 351, FIG. 1, stopping upward movement of the spindle head and effecting upward movement of the tool change member 172. Actuation of the limit switch 351 energizes a solenoid 419 connected to a valve spool 421 of a solenoid valve 423, positioning the valve spool to connect the main supply line 409 with a line 425 to effect upward movement of the tool change member 172. Pressure fluid then flows from the main supply line 409 via a line 427 in the valve spool 421 and into the line 425 to urge the tool holding piston 174 upwardly. Simultaneously, a line 429 in the valve spool 421 connects a line 431 with a line 433 which in turn connects with an exhaust line 435 that discharges into the sump 417. Thus, as a tool holding piston 174 is urged upwardly, hydraulic fluid which formerly urged the piston 189 downwardly, is discharged to the sump.

As the toolholding piston 174 moves upwardly in response to pressure fluid via line 425, hydraulic pressure fluid flows through a vertical line 437, in the member 175 to urge the annular piston ring 225 downwardly. Downward movement of the piston ring 225 moves the clamp actuator 220 downwardly thereby permitting the spring 217 to urge the segments of the tool holder clamp ring 212 radially outward from the groove 208 thereby releasing the tool holder 55A.

As the tool change mechanism 172 continues to move upwardly the upper portion of the tool holder 55A enters the socket 62 of the storage magazine. Further upward movement will lock the toolholder 55A in the holding mechanism 57 by means of the resiliently biased latches 67 of the locks 65, 66 engaging the groove 88 in the toolholder.

After the toolholder 55A is locked within the toolholding mechanism 57 the storage drum 23 is elevated so that all of the tools depending therefrom clear the spindle head 24 and the upper portion of the column when the drum is rotated. To elevate the drum 23, a solenoid 441 connected to move a valve spool 443 of a solenoid valve 445 is energized. Hydraulic pressure fluid will then flow from the main supply line 409 to a line 447, through a line 449 in the valve spool 443 to line 329, flexible line 329A, stationary line 329B, to a port in a stationary distributor 465, and thence to a circular recess in the rotatable column plate 327, and thence via the port 328 to a drilled line connected to the head end of the piston 323, as shown in FIGS. 2 and 5. At one end lines 329B, 457B are supported by a bracket rod 467 guided by a bored column opening for vertical movement. The opposite ends of the lines 329B, 457B carry the circular distributor valve 465 in non-rotating relationship to a rotor valve ring secured to the cap 327.

When the storage drum 23 is raised to its uppermost position it is indexed by means of the Geneva index mechanism 333 positioning a preselected tool in axial alignment above the spindle head 24 to be subsequently inserted therein. As the index locater plate 335 rotates, the limit switch 349 will subsequently be engaged by the dog 353 to stop rotation of the drum at the proper position. After the drum 23 has been indexed to a proper position, the solenoid 441 is deenergized, and the valve spool 443 is returned to its rightward position, as shown in FIG. 5, by means of a spring 449 housed in the solenoid valve 445. When the valve spool 443 is in its rightward position, a line 451 in the valve spool 443 connects the line 329 with the exhaust line 435. Under the weight of the drum 23 pressure fluid will flow from the line 329 via the line 451 to the exhaust line 435 and into the sump 417 as the drum moves to its lower position as shown in FIG. 2. Referring to FIG. 2, the drum 23 together with the tool is shown in phantom lines in its uppermost raised position, the position in which the drum is indexed to present a new tool for subsequent insertion into the spindle head 24.

Downward movement of the storage drum operates to insert a selected tool into the upwardly moved tool change member 172 in the spindle. Next, a solenoid valve 453 having a valve spool 455 is actuated connecting the main pressure supply line 409 with a line 457 via a line 459 in the valve spool 455. The valve spool 455 is moved leftwardly against a spring 461 by means of a solenoid 463. Pressure fluid will then flow from the main supply line 409 via the line 459 through the line 457, flexible line 457A, stationary line 457B to the stationary distributor head 465 which is guided for vertical movement by a bracket 467 relative to the rotatable rotor valve ring 471. From the distributor head 465, the line 457B is connected via a single radial exit, pressure fluid port to transmit fluid to a port 469 in the rotor ring 471, and thence to the hydraulic line 81 which is connected to effect radial retraction of the locks 65, 66 of the holding mechanism 57. The rotor ring 471 rotatably encircles the stationary distributor head 465 and is mounted on the end plate 327 and connected to the drum 23 to rotate therewith. A plurality of other radial ports are formed in the rotor ring 471, each port being connected to a line (not shown) in communication with the locks of a holding mechanism associated with one of a plurality of tool retaining sockets (not shown). Thus, as the rotor ring 471 rotates about the stationary distributor head 465, the ports formed in the rotor ring will sequentially be in communication with the single port located in the distributor head 465 to constitute a rotary valve for releasing only the preselected tool.

It will be apparent then that when the solenoid 463 is energized, pressure fluid will flow from the port in the distributor head 465 to whichever of the ports in the rotor ring 471 that is positioned in communication therewith, thereby releasing the locks in the associated holding mechanism.

Figure 10:
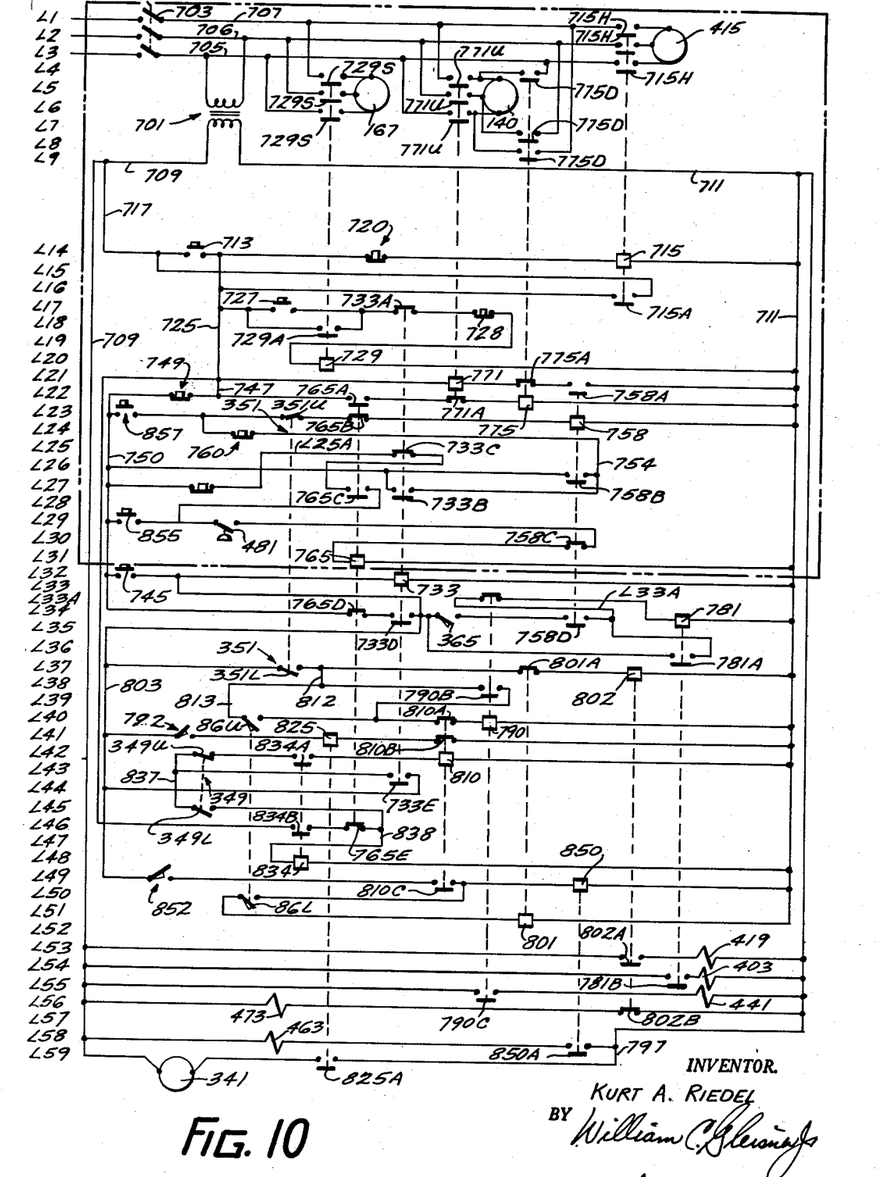
FIG. 10 is a schematic view of the electrical diagram used in connection with FIG. 2.

Pressure fluid flowing in the line 81 will effect radial outward movement of the pistons 79 unlocking the tool held by the latches 67. Inserting movement of the tool has already effected automatic actuation of the segmented clamp ring 212, into resiliently biased clamping engagement with the V-shaped holder groove. After the locks 65 and 66 of the holding mechanism 57 release the selected inserted tool a solenoid 473 connected to the valve spool 421 of the valve 423 is energized. Energization of the solenoid 473 moves the valve spool 421 downwardly, as shown in FIG. 5, placing a line 475 in communication between lines 433 and 425, and a line 477 in the valve spool 421, in communication with the lines 409 and 431. Hydraulic pressure fluid from the line 409 will then flow through the line 477 and the line 431 to urge the tool change member 172 downwardly in the drive spindle sleeve 152. Simultaneously, pressure fluid from the same line will clamp the tool holder in the tool change member 172. To this end, pressure fluid will flow from the chamber surrounding the sleeve 175 into a drilled line 479 to the chamber 233 to urge the clamp actuator 220 upwardly for positively maintaining the tool holder clamp ring 212 in clamping engagement with the annular groove 208 of the toolholder. When the piston 189 reaches its lowermost position, as illustrated in FIG. 2, the internal gear teeth 183 and the external gear teeth 186 will be engaged and the locking members 251 and 252 of the locks 243 and 244 respectively will engage the groove 260 to lock the tool change member in its lowermost position. As described hereinbefore, the locking members 251 and 252 are urged inwardly by means of springs 253 and 254, automatically engaging the groove 260. A pressure switch 481, FIGS. 5 and 10, is actuated to closed position indicating that the piston 189 is in locked position.

Notwithstanding the fact that the tool change member 172 is locked into its lowermost position by means of the locks 243 and 244, the solenoid 473 is retained in an energized condition to continuously supply hydraulic pressure fluid to the chamber 233 to maintain the clamp actuator ring 220 upwardly and keep the tool holder with its associated cutting tool clamped within the tool change member. With a change of tools completed the spindle head 24 is ready to be moved downwardly to perform the next machining operation.

Figures 6, 6A, 7, 8:
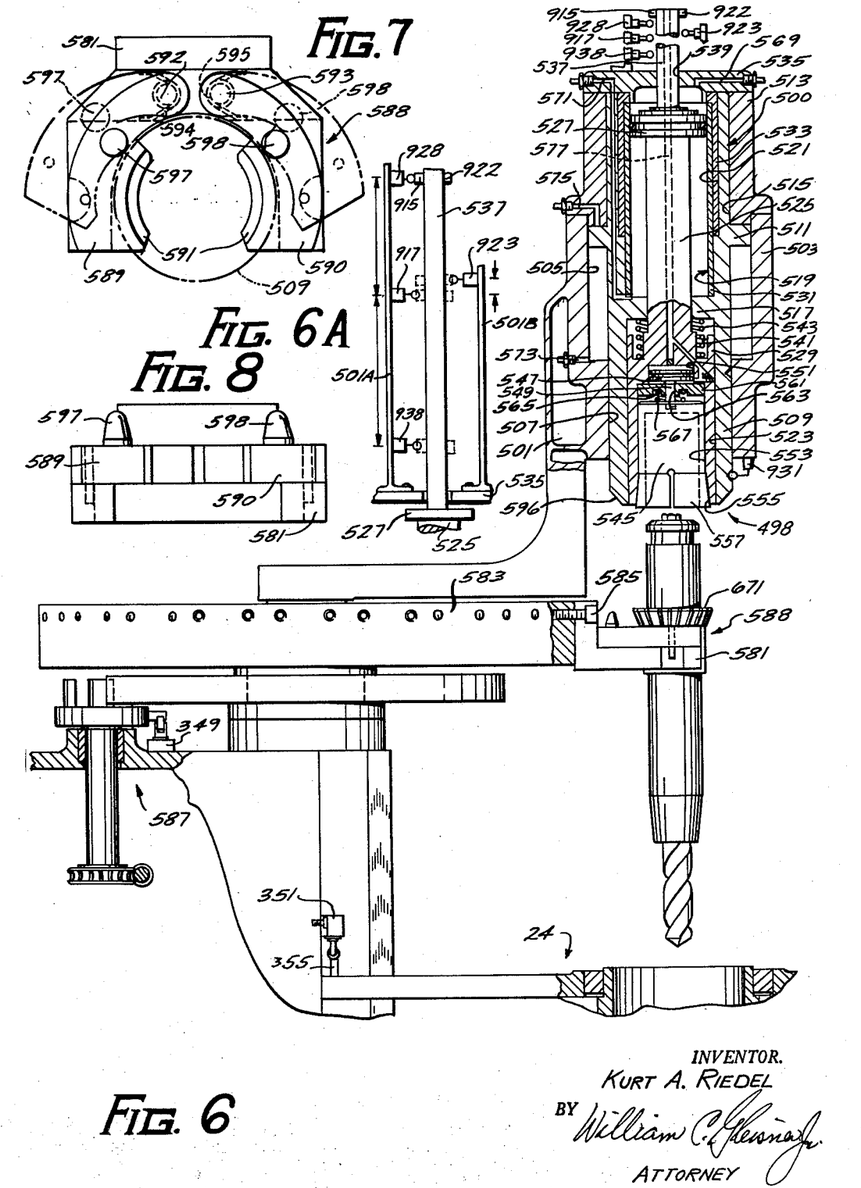
FIG. 6 is a view partly in vertical section of a modification of the invention shown in FIG. 2.
FIG. 6A is an enlarged fragmentary view of the upper portion of the tool transfer mechanism.
FIG. 7 is a top view illustrating a tool holding clamp.
FIG. 8 is a side view of the tool holding clamp shown in FIG. 7.

A modification of the mechanism shown in FIG. 2 for changing tools is illustrated in FIG. 6. A principal difference in the modified version is that axial movement of a movable tool transfer mechanism 500 is used instead of the axial movement of the drum 23 to both remove a tool and insert a new tool in the tool spindle 152. The spindle head and the internal mechanism associated therewith shown in operative relationship with the transfer mechanism 500 in FIG. 6, as identical with the spindle head 24 shown in FIG. 2. The transfer mechanism 500 is supported by an arm 501 which is secured to the column 22. A stationary hollow cylinder 503 is integrally formed with the support arm 501 and provided with a cylindrical bore 505 and a smaller cylindrical bore 507. A movable hollow cylinder 509 provided with an external integrally formed piston flange 511 is slidably carried within the cylinder 503. The piston flange 511 of the cylinder 509 is slidably guided for axial movement within the bore 505, and the portion of the cylinder 509 below the flange 511, as shown in FIG. 6, is slidably carried within the bore 507. The piston flange 511 thus functions to move the cylinder 509. A stationary hollow cylinder 513 having a bore 515 is secured to the top of the cylinder 503 with the bore 515 slidably engaging the portion of the cylinder 509 that is above the piston flange 511, as shown in FIG. 6.

The movable hollow cylinder 509 is provided with an internal flange 517 and bores 519, 521 located above the flange 517, and a bore 523 located below the flange. The flange 517 is provided with a circular opening that slidably engages a piston rod 525 having a piston 527 secured to one end and a cylindrical collet actuator 529 secured to its opposite end. Piston 527 is slidably carried within a sleeve 531 that is secured within the cylindrical bore 519, for slidable, telescoping movement relative to a stationary sleeve 533 secured to an end plate 535 that is secured to the cylinder 513. A second piston rod 537 is secured to the piston 527 and extends upwardly through a circular opening 539 in the end plate 535.

The collet actuator 529 is slidably carried for axial movement within the bore 523. A circular recess 541 is provided in the upper end of the actuator adapted to receive a spring 543 that encircles the lower end of the piston rod 525, having one end seated in the recess 541 and the other end abutting the flange 517 to urge the collet actuator 529 downwardly. The recess 541 is of sufficient depth to receive the entire spring in its compressed state whenever the actuator 529 is moved upwardly into abutting engagement with the flange 517.

Actuator 529 is provided with a relatively movable outlet 545 connected to a piston 547 by means of a piston rod 549, and that is provided with usual radially movable, expansible gripping segments 557. The collet clamp piston 547 is slidably carried within a bore 551 and the collet 545 is slidably carried within a bore 553 which is provided with an outwardly tapered lower end 555 to engage the cooperating tapered surface gripping segments 557. Thus, with upward movement of the collet 545 within the bore 553, the tapered surfaces 555 and 557 will cooperate to provide a gripping action on the upper portion of a toolholder. A spacer 561 is fixedly secured within the bore 553 and provided with a bored opening 563 through which the piston rod 549 extends. In addition, the spacer 561 is provided with a groove 565 to receive one end of a spring 567 therein with the opposite end of the spring abutting the collet 545 urging it to an unclamping condition relative to the actuator 529.

Hydraulic pressure fluid is used to actuate the pistons in the transfer mechanism and is admitted to the cylinders at selected locations. To this end, a line 569 in the end plate 535 is in communication with the upper end of the piston 527, and a line 571 located in the plate 535 as well as in the cylinder 509 supplies pressure fluid to the lower end of the piston 527. Lines 573 and 575 drilled in the cylinders 503 and 513 respectively, provide pressure fluid to the lower and upper sides of the piston 511. Another line 577 is formed in the piston rods 537 and 525 and in the collet actuator 529 to provide for carrying hydraulic pressure fluid to the lower side of the piston 547.

As illustrated in FIG. 6, the tool holders and their associated tools, such as tool holder and its associated tool is releasably carried in a bracket 581 that is secured to a ring or magazine 583 by means of bolts 585. To present a preselected tool to the tool change station, the magazine or ring 583 is rotatable for indexing in response to a Geneva index mechanism 587 that is identical in construction to the one 333 illustrated in FIG. 2. Likewise, the spindle head 498, illustrated in FIG. 6, is identical in construction with the spindle head 24 illustrated in FIG. 2 including the internal tool clamping mechanism. The spindle head 24 as well as the Geneva index mechanism 587 and the storage ring 583 are carried in operative relationship by the column 22 for moving a preselected tool into axial alignment between the tool change mechanism and the tool receiving spindle.

To securely hold the tools in their respective locations in the periphery of the ring or magazine 583, tool holder locks or clamps 588 are provided for each tool and are carried by the respective brackets 581. In FIGS. 6, 7 and 8, one bracket 581 and one lock 588 are shown. Each lock 588 comprises two semi-circular spring biased arms 589 and 590 provided with an interior flange 591 adapted to cooperatively engage a tool as shown in FIG. 6. Both arms 589, 590 are arcuately pivotable about pivot pins 592 and 593, provided at one end of each of the arms, to accommodate a tool being positioned or released from the lock 588. Arcuate radial displacement of each arm 589, 590 is indicated by the phantom lines in FIG. 7. Each arm 589, 590 is biased inwardly by means of springs 594, 595 encircling each of the pins 592, 593 and abutting the bracket 581 and a shoulder on each of the arms.

The arms 589, 590 of each lock are moved arcuately outward to a tool releasing position by the downward movement of the cylinder 509, provided with a beveled edge 596 formed on the lower end of the cylinder, which engages vertical bumpers 597 and 598 respectively secured to the arms 589 and 590, as shown in FIGS. 6, 7 and 8. Upward movement of the cylinder 509 disengages the edge 596 from the bumpers 597 and 598, returning the spring biased arms inwardly to the tool locking position.

The hydraulic circuit used to operate the modified tool changing mechanism illustrated in FIG. 6 is shown in FIG. 9. Since the spindle head 24, FIG. 2, is used with the modified tool change mechanism illustrated in FIG. 6, the hydraulic circuit outlined by the dotted lines in FIG. 5 is used in conjunction with the hydraulic circuit shown in FIG. 9. To best illustrate the operation of the hydraulic circuit, FIG. 9, an illustrative cycle effecting a tool change will be described. In describing this cycle it will be assumed that the spindle head 24, FIG. 6, is carrying a tool and has just reached its uppermost limit of travel. At this time, the tool transfer mechanism 500 will be extended in a downward position as illustrated by the phantom lines in FIG. 9. The movable cylinder 509 and the spring released collet 529 will be retained in the lower position by means of hydraulic pressure fluid transmitted to the upper end of the piston flange 511 and to the upper end of the piston 527.

Pressure fluid is supplied to the flange 511 and piston 527 by a pump 601 driven by energizing an electric motor 603. The pump 601 withdraws hydraulic fluid from a sump 605 via a line 607 and discharges pressure fluid to a line 609 from whence fluid flows to branch lines 637 and 613. To urge the piston 527 downwardly, a solenoid 615 connected to a valve spool 617 of a solenoid valve 619 is energized. Pressure fluid then flows from the line 613 through a line 621 in the valve spool 617 to the line 569 and thence to the upper end of the piston 527. The rod side of the piston 527 is connected to an exhaust line 623 via the line 571 and a line 625 in the valve spool 617.

To urge the piston flange 511 downwardly, a solenoid 663 connected to a valve spool 629 of a solenoid valve 631 is energized placing the line 637 in communication with the line 575 via a line 665 in the valve spool 629. Simultaneously, the opposite side of the piston flange 511 is connected to exhaust via the line 573, a line 667 in the valve spool 629 and a line 611 connected to the exhaust line 623.

At this time, a solenoid valve 639 having a valve spool 641 and a solenoid 643, connects the rod side of the piston 547 to the exhaust line 623. With the solenoid 643 deenergized, a spring 645 urges the valve spool 641 rightwardly placing the line 577 in communication with the exhaust line 623 via a line 647 in the valve spool 641 and a line 649 connected to the exhaust line 623.

Figure 11:
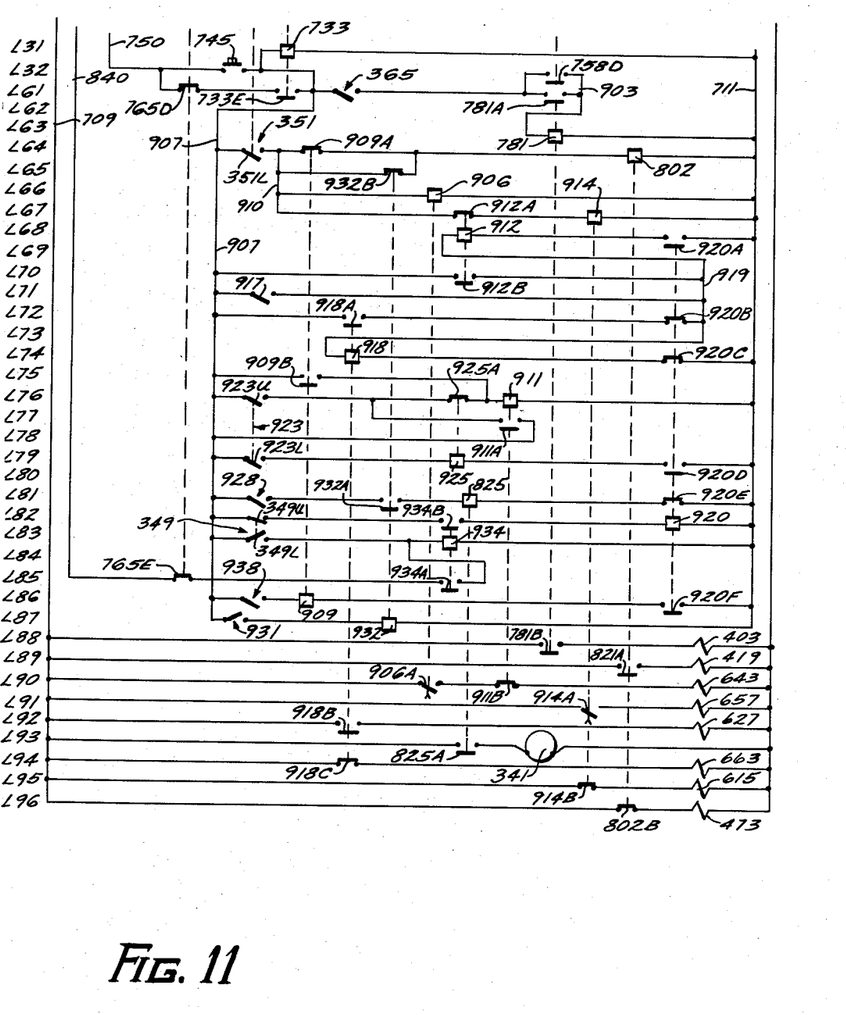
FIG. 11 is a schematic view of the electrical diagram used in connection with the modified view shown in FIG. 6.

As the spindle head 24, FIG. 6, moves upwardly, its movement will be terminated as hereinbefore explained by a limit switch 351, FIGS. 6 and 10, which will also actuate a timer 906, FIG. 11, completing a circuit to energize the solenoid 643 of the solenoid valve 639. Energization of the solenoid 643 moves the valve spool 641 leftwardly against the spring 645. Pressure fluid will then flow from the main supply line 609 to a line 653, and through a drilled line 655 in the valve spool 641 to the line 577 connected to the rod side of the piston 547. Upward movement of the piston 547 will move the collet 545 upwardly to grip the tool.

With the solenoid 643 retained in an energized condition, a solenoid 657 connected to the valve spool 617 is energized moving the valve spool 617 leftwardly. Pressure fluid from the line 613 will then flow via a line 659 in the valve spool 617 to the line 571 and thence to the rod side of the piston 527 to urge it upwardly. Leftward movement of the valve spool 617 connects the opposite side of the piston 527 to the exhaust line 623 via the line 569 and a line 661 in the valve spool 617. As soon as the piston 527 reaches its upper limit of travel, a solenoid 627 connected to the valve spool 629 is energized moving the valve spool downwardly. Downward movement of the valve spool 629 transmits pressure fluid from the line 637 via a line 667 drilled in the valve spool 629 to the line 573 to urge the flange 511 upwardly. At the same time, the opposite side of the piston flange 511 is connected to exhaust via the line 575, a line 633 in the valve spool 629, and a line 611 connected to the exhaust line 623.

As soon as the piston flange 511 begins to move upwardly, the solenoid 643 of the valve 639 is deenergized with the valve spool 641 moved rightwardly by the spring 645. Rightward movement of the valve spool 641 connects the line 577 to exhaust via the drilled line 647 and the line 649 connected to the exhaust line 623. With the pressure relieved from the piston 547, the spring 567 urges the collet 545 downwardly thereby releasing the toolholder and depositing it in the resiliently biased mechanical locks associated with the storage magazine.

As soon as the flange 511 reaches its upper limit of travel, a limit switch is actuated to provide an index movement of the tool storage ring 583, positioning a new tool for insertion into the upwardly moved tool change member in the spindle head 498. When the index movement is completed, the solenoid 663 associated with the valve 631 is energized moving the valve spool 629 upwardly. Upward movement of the valve spool 629 connects the pressure fluid line 637 via the valve spool line 635 to the line 575 to urge the piston flange 511 downwardly. It will be noted that downward movement of the piston flange 511 also effects downward movement of the collet 529 and likewise, the piston 527. As the piston flange 511 and cylinder 509 move downwardly, the collet 545 will slide over the newly positioned toolholder. As the sleeve 509 and flange 511 approach their lower limit of travel, the collet 545 will be urged upwardly against the spring 567 due to the lower portion of the collet abutting the toolholder thereby frictionally locking the tool holder in the collet 545 due to the upward movement of the colelt relative to the actuator.

When the flange 511 reaches its lower limit of travel, the solenoid 643 is energized to force move the collet upwardly securely under hydraulic pressure to grip the toolholder. Energization of the solenoid 643 moves the valve spool 641 leftwardly thereby transmitting fluid from the line 653 through the drilled line 655 to the line 577 connected to the rod side of the piston 547. At this point the solenoids 643 and 663 are retained in an energized condition.

The solenoid 657 is deenergized and simultaneously the solenoid 615 is energized moving the valve spool 617 rightwardly as shown in FIG. 9. Rightward movement of the valve spool 617 connects the line 613 with the line 569 via the drilled line 621 to supply hydraulic pressure fluid to the upper end of the piston 527. The piston 527 will then be urged downwardly, as shown in FIG. 9, transferring the toolholder into position in upwardly moved changer member in the spindle head 498. When the piston 527 reaches its lower limit of travel, the solenoid 643 is deenergized in order to release the tool holder from the collet 545. Deenergization of the solenoid 643 connects the line 577 connected to the rod side of the piston 547 to exhaust via the drilled line 647 in the valve spool 641 and the line 649 connected to the exhaust line 623. Thereafter, the changer member grips the tool and transfers it to the operating end of the spindle as hereinbefore explained.

At this point, the spindle head 24 can be moved downwardly into position for operating on work. It will be noted that the solenoid 615 and 663 will remain in an energized condition retaining the piston 527 and the piston flange 511 in their lower position. The lower end of the sleeve 509 and the collet 545 will also extend downwardly as shown by the phantom lines in FIG. 9. It will be apparent that each time a tool change is made or required the cycle of events just described will take place to effectuate such tool change.

The electrical supply and control system diagrammatically illustrated in FIG. 10 shows that power is furnished from three phase electrical power lines L1, L2 and L3 connectable to energize the spindle motor 167, the head feed motor 140, and the hydraulic pump motor 415; and by way of a transformer 701, at reduced voltage, to the control system. A disconnect switch 703 controls connection of the power lines L1, L2 and L3 to conductors 705, 706 and 707 which are connectable to the spindle motor 167, the head feed motor 140 and the hydraulic pump motor 415. The primary winding of the transformer 701 is connected to the conductors 705 and 706, and the secondary of the transformer is connected to conductors 709 and 711. The usual protective fuses and overload devices are provided in the electrical circuit but are omitted from the schematic drawing, FIG. 10, for the sake of clarity.

To facilitate the identification and location of the various elements and circuits in the electrical drawing, a vertical column of numbers with a letter prefix is provided at the lefthand side of the drawing with each vertical number identifying a horizontal electrical conductor.

With the machine energized by closure of the disconnect switch 703, the electrical control circuit can be activated for operation by momentarily depressing a master start switch 713 completing a circuit through a master stop switch 720 to energize a hydraulic pump relay 715. This circuit is completed through the energized conductor 709 via a vertical conductor 717 and along the horizontal line L14, to the energized conductor 711. Energization of the relay 715 to closed position, effects closure of contact bars 715H to transmit power from the input power lines 705, 706, 707, to the power supply lines connected to effect energization of the hydraulic pump motor 415. Simultaneously, a normally open contact bar 715A is moved to a closed position completing a holding circuit for the relay 715 upon release of the master start switch 713. This circuit is completed from the conductor 717 via horizontal line L15, the now closed contact bar 715A, and horizontal line L16 to a vertical conductor 725.

To start the spindle motor 167, a spindle start push button switch 727 is momentarily depressed completing a circuit via a normally closed contact bar 733A associated with a tool change relay 733 and a spindle stop switch 728 to energize a spindle start relay 729. This circuit is completed along horizontal lines L17, L19 and L20 to the energized conductor 711. Energization of the relay 729 moves the associated contact bars 729A, and 729S to the closed position. Closure of the contact bar 729A establishes a holding circuit along horizontal line L18 to maintain the relay 729 energized, and closure of the contact bars 729S completes the circuit for energizing the spindle motor 167.

With the machine tool energized as described above, a typical cycle involving a complete tool change will now be described. At the start of this cycle it will be assumed that the spindle head 24 is in a lower position adjacent to a workpiece. To begin the tool change cycle, a tool change push button switch 745 is momentarily depressed energizing the tool change relay 733. With the switch 745 depressed, current flows from the conductor 725 to a vertical conductor 747, along line L22 and through a normally closed contact bar of a stop switch 749 to a vertical conductor 750. From the conductor 750 the circuit continues along line L32 via the contact bar of the now closed tool change switch 745 to the tool change relay 733 and thence to the energized conductor 711. Energization of the tool change relay 733 moves the contact bar 733A upwardly to interrupt the circuit energizing the spindle motor relay 729 and thereby deenergizing the spindle motor 167. A contact bar 733B, line L27, associated with the relay 733 is moved upwardly into bridging engagement completing a circuit to energize a head up relay 758. Current flows from the conductor 750 along line L26, the now closed contact bar 733B and line L27 to a vertical conductor 754. From the conductor 754 the circuit continues via horizontal line L24, a normally closed contact bar of a head-up stop switch 760 and along line L23 through a normally closed contact bar 351U of the limit switch 351 and normally closed contact bar 765B associated with a head down relay 765 to the head up relay 758 connected to the energized conductor 711.

Energization of the head up relay 758 moves contact bars 758A, 758B, 758C, and 758D associated therewith. Contact bar 758A is moved into bridging engagement with conductors in line L21 completing a circuit through a contact bar 775A associated with a feed down relay 775 to energize a feed-up relay 771. Energization of the feed-up relay 771 moves the associated contact bars 771U to closed position to energize the feed motor 140 to effect upward movement of the spindle head 24. Simultaneously, a contact bar 771A is moved to the open position to preclude energization of the feed-down relay 775.

Another contact bar 733D, associated with the now energized relay 733 is moved to the closed position completing a holding circuit to maintain the relay 733 energized upon releasing the tool change push button switch 745. The holding circuit is established from the vertical conductor 750 via horizontal line L34, a normally closed contact bar 765D to the now closed contact bar 733D and thence along horizontal line L33 returning to line L32.

As the spindle head moves upwardly approaching its upper limit of travel, the dog 360 engages the limit switch 365, FIGS. 1 and 10, moving it to a closed position completing a circuit along horizontal lines L34, L33 and L32 energizing a tool unlock relay 781. The circuit is established from the energized conductor 750 via the normally closed contact bar 765D, the now closed contact bar 733D of the energized tool change relay 733 and through the now closed contact bar of the limit switch 365 to the now closed contact bar 758D of the energized feed-up relay 758. From the contact bar 758D the circuit continues via a normally closed contact bar 790A associated with a magazine relay 790, L33, and thence along L33 returning to the relay 781 connected to the energized conductor 711, in line L34.

Energization of the tool unlock relay 781 moves both of its associated contact bars 781A and 781B to closed position. Closure of the contact bar 781A bridges conductors in line L36 establishing a holding circuit for the relay 781 through horizontal line L35 and returning to line L34. Closure of the contact bar 781B completes a circuit along line L54 for energizing the solenoid 403 releasing the locks 243 and 244 permitting the tool change member 172 to move upwardly, as best shown in FIG. 2.

Shortly after the dog 360 actuates the limit switch 365, the spindle head 24 will reach its upper limit of travel and the dog 355 will actuate the limit switch 351, FIGS. 1 and 10, moving the associated contact bar 351U to the open position and the associated contact bar 351L to a closed position. Opening the contact bar 351U interrupts the circuit in horizontal line L23 deenergizing the head-up relay 758. Deenergizing the head up relay 758, in turn, moves the associated contact bar 758A into the open position interrupting the circuit in line L21 deenergizing the feed motor relay 771. Deenergization of the feed motor relay 771 moves the asociated contact bars 771U to the open position stopping the feed motor 140. In addition, the associated contact bars 758D and 758B of the relay 758, are moved to the open position. Contact bar 758B interrupts the holding circuit between the conductors in line L26 for the relay 758, and the contact bar 758D interrupts the circuit in line L33 deenergizing the relay 781.

Closure of the contact bar 351L of the limit switch 351 completes a circuit along line L37 via a normally closed contact bar 801A associated with relay 801, to energize a relay 802 for effecting upward movement of the tool change member 172. This circuit is completed from horizontal lines L34 and L35 to a vertical conductor 803, and thence along line L37. Energization of the relay 802 moves the associated contact bar 802A to the closed position completing a circuit from conductor 709 along horizontal line L53 to energize the solenoid 419 for effecting upward movement of the tool change member 172. Simultaneously, movement of the contact bar 802B to open position interrupts the circuit energizing the solenoid 473, interrupting the hydraulic pressure fluid effecting downward movement of the tool change member 172.

As described hereinbefore, as the tool change member 172 reaches its upper limit of travel, FIG. 2, the limit switch 86 will be momentarily actuated as the upper portion of the tool engages the locks 65 and 66. Actuation of the limit switch 86 moves the associated contact bar 86U to closed position establishing a circuit through a normally closed contact bar 810A, associated with a control relay 810, to energize the magazine relay 790. This circuit is completed from line L37 through a vertical conductor 812, along line L38 to a vertical conductor 813, and through the now closed contact bar 86U in line L40. The circuit continues along line L40 through a normally closed contact bar 810A and relay 790 to the energized conductor 711.

Energization of the magazine relay 790 moves its associated contact bar 790B to a closed position bridging conductors in line L38 to establish a holding circuit for the relay 790 from conductor 812 through horizontal lines L38 and L39 to L40. Simultaneous closure of the contact bar 790C completes a circuit from the conductor 709 along line L55 to energize solenoid 441 for raising the magazine 23. When the magazine 23 reaches its upper limit of travel, a limit switch 792 mounted on the column 22 engages a notch in the bracket rod 467, the bracket rod being moved upwardly with the magazine, as shown in FIG. 5. Engagement of the switch 792 with the notch deactuates the switch 792 moving its contact bar to its normally closed position completing a circuit energizing an index relay 825. The circuit is completed from the conductor 803 along line L41 through the normally closed contact bar of the now deactuated limit switch 792, the index relay 825 and normally closed contact bar 810B. Energization of the index relay 825 moves its associated contact bar 825A to closed position energizing the index motor 341 for indexing the magazine 23. The circuit for energizing the index motor 341 is established from the vertical conductor 709 along the horizontal line L59 through the index motor 341 and through the now closed contact bar 825A to the vertical conductor 797.

As the index motor 341 begins to rotate the index locater plate 335, FIG. 2, the limit switch 349 will be actuated moving the associated contact bar 349U to the open position and the associated contact bar 349L to the closed position. Closure of the contact bar 349L establishes a circuit for energizing control relay 834. This circuit is established from the conductor 803 along line L44, and thence along line L43, through the now closed contact bar 733E to a vertical conductor 837. The circuit continues through the now closed contact bar 349L, along line L45 to a vertical conductor 838, and along horizontal lines L47 and L48 to the relay 834 connected to the energized conductor 711.

Energization of the control relay 834 moves both its associated contact bars 834A and 834B to the closed position. Closure of the contact bar 834B establishes a holding circuit along line L46 for the contact relay 834 from the vertical conductor 725 through a vertical conductor 840, and through the now closed contact bars 834B, and 765E to the conductor 838.

As the index locater plate 335 completes one revolution of movement, the limit switch 349 will again be actuated moving the contact bar 349L to the open position and the contact bar 349U to the closed position. Closure of the contact bar 349U establishes a circuit along line L42 through the now closed contact bar 834A for energizing the control relay 810. Energization of the control relay 810 moves the associated contact bars 810A, 810B to the open position and the contact bar 810C to the closed position. Movement of the contact bar 810A to the open position interrupts the circuit in line L40 to deenergize the magazine relay 790, which in turn, moves its associated contact bar 790C to the open position interrupting the circuit in horizontal line L55 deenergizing the solenoid 441 and effecting downward tool inserting movement of the magazine. Movement of the contact bar 810B to the open position interrupts the electrical circuit in line L41 to deenergize the index relay 825, moving its associated contact bar 825A to the open position deenergizing the index motor 341. Closure of the contact bar 810C conditions a circuit for the subsequent energization of a magazine tool unlock relay 850.

Thus, upon the deenergization of the magazine relay 790, the magazine will move downwardly to its lowermost position as illustrated in FIG. 2. When the magazine 23 reaches its lowermost position, a limit switch 852 mounted on the column 22 is deactuated to normally closed position by engaging a notch located in the bracket rod 467 that moves downwardly with the magazine. Actuation of the limit switch 852, FIGS. 5 and 10, moves its contact bar to normally closed position completing a circuit along line L49 for energizing the tool unlock relay 850. This circuit is completed from conductor 803 through the now closed contact bar of the limit switch 852, the now closed contact bar 810C and the relay 850 which, in turn, is connected to the energized conductor 711. Energization of the relay 850 moves its associated contact bar 850A to the closed position energizing the relay 463. The circuit for energizing the relay 463 is established from the conductor 709 along horizontal line L58 to the conductor 797.

Energizing the solenoid 463 transmits pressure fluid to the locks 65, 66, FIG. 2, moving them radially outward releasing the tool from the storage magazine and simultaneously actuating the limit switch 86, FIGS. 2 and 10. Actuation of the switch 86 moves its associated contact bar 86L, FIG. 10, to the closed position completing a circuit for energizing the relay 801. The circuit for energizing relay 801 is established from line L49 via line L50 and the now closed contact bar 86L, and along horizontal line L51 to the relay 801 connected to the conductor 711. Energization of the relay 801 moves its associated contact bar 801A to the open position interrupting the circuit along line L37 to deenergize the relay 802. Deenergization of the relay 802 releases the hydraulic pressure fluid urging the tool change mechanism 172 upwardly, by moving the associated contact bar 802A to the open position deenergizing the solenoid 419. Simultaneously, the contact bar 802B is moved to a closed position completing a circuit for energizing the solenoid 473 directing pressure fluid to urge the tool change member 172 downwardly.

The solenoid 473 is energized by a completed circuit from conductor 709 along line L56 through the solenoid 473 and the now closed contact bar 802B to the energized conductor 797. Energization of the solenoid 473 not only effects downward movement of the tool change member 172, FIG. 2, but simultaneously clamps the tool within the tool change member 172. When the tool change member 172 reaches its lowermost position, as illustrated in FIG. 2, the locks 243 and 244 will be momentarily actuated radially outward, and returned under spring pressure engaging the groove 260, securely locking the tool change member 172 in the downward position. With the tool change member 172 in locked position, pressure fluid will actuate the pressure switch 481 conditioning a circuit for subsequent energization of the spindle head-down relay 765. At this point it is emphasized that the solenoid 473 is now maintained energized until another tool change cycle is begun.

With a complete tool change having now been effected, the spindle head 24 is ready to be moved downwardly to operating position for a subsequent machining operation. To move the spindle head 24 downwardly, a spindle head-down push button switch 855, line L29, is momentarily depressed completing a circuit to energize the spindle head-down relay 765. Current for energizing the relay 765 flows from the conductor 750 via horizontal line L29 through the now closed contact bar of the switch 855 and the closed contact bar of the pressure switch 481 to the line L30 and through the normally closed contact bar 758C. From line L30 the circuit continues via line L31 through the relay 765, to the conductor 711. Energization of the relay 765 moves associated contact bars 765A and 765C to the closed position and the contact bars 765B, 765D and 765E to the open position. Closure of the contact bar 765A completes a circuit along horizontal line L22 for energizing the spindle down relay 775. This circuit is established from the conductor 747 through the now closed contact bars 765A and 771A to the relay 775 connected to the conductor 711. Energization of the relay 775 moves the associated contact bars 775D to the closed position completing a circuit for the energization of the feed motor 140 to effect downward movement of the spindle head 24. Simultaneously, the contact bar 775A is moved to the open position to preclude the energization of the relay 771 which effects upward movement of the spindle head 24.

Closure of the contact bar 765C establishes a holding circuit for the relay 765 to maintain the relay energized upon the release of the push button switch 875. The holding circuit is established from the conductor 750 along line L27 through the contact bar of a normally closed push button stop switch 856 and thence along horizontal line L25 through the now closed contact bar 733C returning along line L25A to horizontal line L27. The circuit is completed through the now closed contact bar 765C and along line L28 connected to horizontal line L29.

Movement of the contact bar 765D to the open position interrupts the electrical circuit in line L34 effecting deenergization of the tool change relay 733, control relay 816, unlocking relay 850, and relay 860. Deenergization of the relay 733 moves its associated contact bar 733A line L17 to a closed position conditioning a circuit for subsequent energization of the spindle motor relay 729. Deenergization of the relay 810 moves the associated contact bars 810A, 810B to the closed position conditioning circuits for a subsequent tool change cycle. Contact bar 810C as well as the contact bar 765D interrupt the electrical circuit to the relay 850 to deenergize it, thereby deenergizing the solenoid 463 resulting in the spring biased locks 65, 66 being moved radially inward to a locking position. To stop downward movement of the spindle head 24, the stop switch 856 is momentarily depressed interrupting the holding circuit to the relay 765 and effecting deenergization of the feed motor relay 140.

To effect upward movement of the spindle head 24, a spindle head-up push button switch 857 is momentarily depressed completing a circuit along line L23 energizing the relay 758. The circuit is completed from conductor 750 via the now closed contact bar of the switch 857 and normally closed contact bars 351U, 765B to the relay 758. Energization of the relay 758 effects upward movement of the associated contact bar 758A completing a circuit, line L21, for the energization of the relay 771. With the energization of the relay 771, the associated contact bars 771U, lines L4, L5 and L6, are moved to the closed position completing a circuit energizing the feed motor 140 effecting upward movement of the spindle head 24. Simultaneously contact bar 758B, line L26, associated with the relay 758, is moved to the closed position establishing a holding circuit to maintain the relay 758 energized upon release of the push button switch 857.

Although a spindle head-up push button switch is provided, depressing the tool change push button 745 will effect upward movement of the head 24 if it is not in the uppermost position that is required for effecting a tool change.

The electrical circuit shown in FIG. 11 is used in connection with the modification of the invention illustrated in FIG. 6. In each embodiment of the invention, a portion of the electrical circuit is identical and common to both and therefore is not repeated in FIG. 11. Referring to FIG. 10, that portion of the electrical circuit common to both embodiments is outlined by phantom lines. For the sake of clarity, a very small portion of this identical portion of the circuit in FIG. 10 is included in FIG. 11 to illustrate operative coordination therebetween.

A vertical column of numbers with a letter prefix is used in FIG. 11 to facilitate the description of the circuit in similar manner as was done in FIG. 10. Further, reference numerals common to both FIGS. 10 and 11 are used wherever applicable.

Referring now to FIGS. 6 and 11, a typical cycle effecting a change of tools between the spindle head 24 and the storage magazine 583 will now be described. In describing the tool change cycle, it will be assumed that the spindle head 24 is in a lower operating position having just completed a machining operation and now requires a tool change. Thus, the control circuit, the spindle motor 167 and hydraulic motor 415 are energized as described hereinbefore with reference to FIG. 10. At this time, the outer cylinder or positioning sleeve 509, FIG. 6, is in its lowermost position bottoming against the arms 589, 590 of the tool holder lock 588, with the beveled edge 596 engaging the bumpers 597, 598 holding the arms in pivoted open position. Likewise, the collet actuator 529 and associated mechanism is fully extended downwardly through the open tool holder lock 588 to its lower limit of travel. In addition, the resiliently releasable collet 545 is in an unclamped or tool receiving position.

With the assumed machine conditions being maintained by the energized electrical circuit, a tool change cycle is initiated by momentarily depressing the tool change push button switch 745. Depressing the push button switch 745 completes a circuit from energized conductor 750 along horizontal lines L32 and L31 to the energized conductor 711 energizing the tool change relay 733. Energization of the tool change relay 733 opens its associated contact bar 733A, line L17 in FIG. 10 interrupting the circuit energizing the spindle start relay 729 thereby deenergizing the spindle motor 167. Simultaneously, the contact bar 733B, line L27, FIG. 10, is moved to a closed position completing a circuit along vertical conductor 754 and horizontal line L24 through the stop switch 760 to line L23 for energizing the feed-up relay 758. The circuit is completed along line L23 through the now closed contact bar 351U, normally closed contact bar 765B and the relay 758 to the energized conductor 711. In addition, the associated contact bar 733E is closed completing a holding circuit through the normally closed contact bar 765D in horizontal line L61, to maintain the tool change relay 733 energized upon releasing the push button switch 745. With this circuit established, the spindle head 24 is moved upwardly and as it approaches its upper limit of travel the dog 360 will actuate the limit switch 365, line L61, moving it to a closed position completing a circuit energizing a spindle sleeve unlock relay 781. The circuit is completed through the closed contact bar of the switch 365, line L61, through the now closed contact bar 758D in line L32, to a vertical conductor 903. From the conductor 903 the circuit continues along horizontal line L62 and thence along line L63 through the relay 781 to the energized conductor 711. Energization of the relay 781 moves the associated contact bar 781A, line L61, to the closed position establishing a holding circuit for the relay 781, and moves the associated contact bar 781B to the closed position completing a circuit from conductor 709 along horizontal line L88 energizing the solenoid 403 to unlock the tool change mechanism 172 in the spindle.

As the spindle head 24 reaches its upper limit of travel, the dog 355 actuates the limit switch 351 moving its associated contact bar 351L to the closed position completing a circuit to energize the tool change up relay 802 and a timer 906. The circuit for energizing the relay 802 is completed from the horizontal line L61 via a conductor in horizontal line L62, a vertical conductor 907, and along line L64 through the now closed contact bar 351L and a normally closed contact bar 909A of a control relay 909 to the conductor 711. Energization of the relay 802 moves its associated contact bar 802A to the closed position completing a circuit from conductor 709 along horizontal line L89 to energize the solenoid 419, and simultaneously moves the contact bar 802B to the open position interrupting a circuit energizing the solenoid 473. Energization of the solenoid 419 effects upward movement of the spindle tool change member 172 and simultaneously unclamping the tool held therein, and with continued upward movement of the tool change mechanism 172 inserts the tool into the open collet 545.

The circuit for energizing the timer 906 is completed from the horizontal line L64 via vertical conductor 910 and along line L66 to the conductor 711. Energization of the timer 906 effects a subsequent closure of its associated contact bar 906A completing a circuit from conductor 709 along horizontal line L90 and through a contact bar 911B of a clamping relay 911 to energize the solenoid 643. Energization of the solenoid 643 moves the collet 545 upwardly within the collet actuator 529 securely clamping the tool within the collet. It is emphasized that the timer 906 provides a sufficient time delay before completing the circuit energizing the solenoid 643 to permit the tool mechanism 172 to reach its upper limit of travel.

Simultaneously with the closure of the contact bar 351L and energization of the relay 802 and timer 906, a parallel circuit is established from horizontal line L64 via vertical conductor 910 and along line L67 through a normally closed contact bar 912A associated with a control relay 912, energizing a timer 914. Energization of the timer 914 closes its associated contact bar 914A completing a circuit from conductor 709 along the horizontal line L91 to energize the solenoid 657 thereby effecting upward movement of the collet actuator 529 and its associated mechanism removing the tool from the tool change member 172. Simultaneously, the associated contact bar 914B is moved to the open position interrupting a circuit in line L95 deenergizing the solenoid 615. The time delay provided by the timer 914 is of a longer interval than that provided by the timer 906 thereby providing a sufficient time interval for the tool to be clamped in the collet 545 prior to being moved upwardly by the collet actuator 529.

With the sleeve 509 urged downwardly and the collet clamped, the actuator is urged upwardly to deposit the withdrawn tool in the empty magazine holder. Thus, as the collet actuator 529 reaches its intermediate, tool restoring limit, the dog 915 carried by the piston rod 537 actuates a limit switch 917 closing its associated contact bar completing a circuit energizing a position sleeve control relay 918. The circuit is completed from the energized vertical conductor 907 along horizontal line L71 to vertical conductor 919, and thence along line L73 and L74 through a normally closed contact bar 920C associated with a control relay 920. Energization of the relay 918 moves its associated contact bar 918A to closed position, completing a holding circuit for the relay 918 along horizontal line L72. Simultaneously, the associated contact bar 918B is closed completing a circuit along line L92 energizing the solenoid 663 effecting upward movement of the outer sleeve 509. At the same time, the contact bar 918C is moved to the open position interrupting the circuit along line L94 deenergizing the solenoid 627 which had been maintained to urge the sleeve 509 downwardly.

As the outer cylinder or injector sleeve 509 begins to move upwardly, the dog 922 carried by the piston rod 537 actuates a limit switch 923 closing its contact bar 923U completing a circuit along the horizontal line L76 through a normally closed contact bar 925A, associated with a control relay 925, energizing the relay 911. Energization of the relay 911 moves its associated contact bar 911B to the open position interrupting the circuit along horizontal line L90 deenergizing the solenoid 643 releasing the collet 545 in the collet actuator 529 thereby releasing the tool held therein. It is emphasized that the outer cylinder or injector sleeve 509 is moved upwardly a sufficient distance to disengage the tool holder clamp 588 prior to actuating the limit switch 923 which releases the tool. Thus, the spring biased tool lock 588 is disposed in a closed or clamping position prior to releasing the tool from the collet 545. With the energization of the relay 911, another associated contact bar 911A is moved to the closed position establishing a holding circuit for the relay from conductor 907 along horizontal lines L78, L77 and through a vertical conductor interconnected with the horizontal line L76.

With the solenoid 657 maintained energized to retain the collet actuator 529 in an upward or raised position, it will be apparent that the collet actuator will be moved upwardly simultaneously with the outer cylinder 509. As the outer cylinder reaches its fully retracted upper limit of travel, the dog 915 actuates a limit switch 928 moving its associated contact bar to a closed position, line L81, conditioning a circuit for subsequent energization of an index relay 825. Another limit switch 931, secured to the cylinder 503, is actuated by engaging a notch in the outer cylinder 509 when the outer cylinder reaches its upper limit of travel. Actuation of the limit switch 931 moves its associated contact bar to a closed position completing a circuit along horizontal line L87 energizing a control relay 932. Energization of the relay 932 moves its associated contact bar 932A to a closed position completing a circuit along horizontal line L81 through a contact bar 920E energizing the index relay 825.

Energization of the index relay 825 moves the contact bar 825A to the closed position completing a circuit along horizontal line L93 energizing the index motor 341 to provide for an index movement of the magazine or ring 583. As the index motor begins to rotate the limit switch 349, FIGS. 6 and 11, is actuated moving its associated contact bar 349L to a closed position completing a circuit along horizontal line L83 energizing a control relay 934, and simultaneously moving the associated contact bar 349U to the open position. Energization of the relay 934 moves an associated contact bar 934A to the closed position establishing a holding circuit from conductor 709, via horizontal line L85, normally closed contact bar 765E and lines L84 and L83.

Upon completion of an index movement, the now open contact bar 349U of the limit switch 349 is moved to the closed position completing a circuit along horizontal line L82 and through the now closed contact bar 934B to energize a control relay 920.

Energization of the control relay 920 moves its associated contact bar 920E line L81, to the open position deenergizing the index relay 825 which, in turn, stops the index motor 341. Simultaneously the contact bar 920B, line L72, is moved to the open position interrupting the circuit energizing the relay 918 in line L74. Deenergization of the relay 918 moves its associated contact bar 918B to the open position interrupting the circuit along line L92 deenergizing the relay 663 and simultaneously closes the contact bar 918C completing a circuit along horizontal line L94 energizing the solenoid 627. Energization of the solenoid 627 effects downward movement of the outer cylinder 509 together with the collet and collet actuator 529 to receive the next preselected tool. As the outer cylinder 509 engages the bumpers 597, 598 with the beveled edge 596, the dog 922 again actuates the limit switch 923 moving the associated contact bars to the closed position.

Closure of the contact bar 923L completes a circuit along the horizontal line L79 through the now closed contact bar 920D energizing the relay 925. Energization of the relay 925 moves its associated contact bar 925A to the open position interrupting the circuit along line L76 deenergizing the relay 911. With the deenergization of the relay 911 the contact bar 911B is moved to the closed position completing a circuit from the vertical conductor 709 along the horizontal line L90 through the now closed contact bar 906A energizing the solenoid 643. Energizing the relay 643 moves the collet 545 upwardly to a clamping position, grasping the tool held within the tool holder locks 588, clamping it in the collet. At this point it is emphasized that the outer cylinder 509 has not yet reached its lower limit of travel and therefore will continue to move downwardly, simultaneously engaging the bumpers 597, 598 opening the storage magazine tool holder lock or clamp 588. Since the collet 545 firmly grips the tool prior to opening the tool holder lock 588, and before the outer cylinder 509 has reached its lower limit of travel, the collet actuator 529 is urged upwardly against the spring 543 until the sleeve 509 is moved to its lower limit opening the tool holder lock 588.

When the injector sleeve or outer cylinder 509 has reached its lower limit of travel, the limit switch 931 is actuated by engaging a notch in the injector sleeve 509, closing its associated contact bar and completing a circuit from the vertical conductor 907 along horizontal line L87 energizing the relay 932. Energization of the relay 932 moves the associated contact bars 932A, 932B conditioning the control circuit for subsequent functions. Simultaneously with the sleeve 509 reaching its lower limit of travel, the dog 915 again actuates the limit switch 917 moving its contact bar to a closed position energizing the control relay 912. This circuit is completed from vertical conductor 907 along horizontal line L71, vertical conductor 919, line L69, the relay 912 and the now closed contact bar 920A in line L68 to the conductor 711. Energization of the relay 912 opens the contact bar 912A interrupting the circuit in line L67 to deenergize the timer 914. With the deenergization of the timer 914, the contact bar 914B, line L95, is moved to a closed position completing a circuit energizing the solenoid 615. Energization of the solenoid 615 actuates the piston to move the collet actuator 529 and associated mechanism, together with the tool clamped now in the collet 545, downwardly to insert the tool into the tool change member 172 carried in the spindle head.

When the collet actuator 529 reaches its fully extended or lower limit of travel, the dog 915, FIG. 6, actuates a limit switch 938 closing its associated contact bar completing a circuit from the vertical conductor 907 along horizontal line L86 and through the now closed contact bar 920F energizing the control relay 909. Energization of the relay 909 moves its associated contact bar 909B to the closed position completing a circuit from vertical conductor 907 along the horizontal line L75 and thence along the line L76 energizing the clamping relay 911. With the energization of the relay 911, the associated contact bar 911B is moved to open position interrupting the circuit along horizontal line L90 deenergizing the solenoid 643 thereby releasing the tool from the tool changer collet 545 and depositing it in the tool change mechanism 172. Simultaneously with the energization of the relay 909, the associated contact bar 909A is moved to the open position interrupting the circuit along horizontal line L64 resulting in the deenergization of the relay 802. With the deenergization of the relay 802 the contact bar 802A is moved to open position interrupting the circuit along line L89 now energizing the solenoid 419, and moves the contact bar 802B to a closed position establishing a circuit from vertical conductor 709 along the horizontal line L96 to energize the solenoid 473 effecting subsequent downward movement of the spindle tool change member 172. At this point, it is emphasized that the solenoid 473 is maintained energized during a subsequent downward movement of a spindle head in a machining operation in order to maintain the tool locked within the tool change member 172 and spindle as described hereinbefore.

From the foregoing explanation of the construction and operation of the preferred embodiment of this invention, it is apparent that there has been provided a greatly improved tool change mechanism for effecting an interchange of tools between a storage drum or magazine and a tool spindle in a machine tool. The mechanical structure and the cooperating hydraulic actuating control system associated therewith are so disposed to constitute a greatly improved tool change mechanism.

Although two embodiments of the invention have been shown and described herein, it will be apparent to one skilled in the art to which this invention relates, that various modifications in the manner of constructing the tool change mechanism may be made without departing from the spirit and scope of the invention as defined in the subjoined claims.

The principles of this invention having now been fully explained in connection with the foregoing description, I hereby claim as my invention:

1. In a tool change mechanism, a power driven tool spindle selectively movable to a plurality of positions and having a rearward end and an operating end, a tool carrying magazine selectively movable to a plurality of positions for presenting a tool at a predetermined position preparatory to the transfer of any one of the tools in the magazine to or from said spindle, and a tool transfer member carried wholly within said spindle for movement between the two ends of said spindle and adapted to cooperate with said magazine to transfer a tool to said spindle from said magazine and to return the tool from said spindle to said magazine.

2. In a tool change system for a machine tool; a frame; a tool storage magazine carried by said frame and adapted to be indexably movable relative to said frame; a power driven rotatable tool spindle slidably carried by said frame and having a rearward end and an opearting end; a tool change member carried wholly within said spindle for axial movement therein between the two ends, said tool spindle and said tool storage magazine cooperatively movable to effect a change of tools in said tool spindle from the rearward end of said tool spindle.

3. In a machine tool, a frame, a rotatably power driven spindle carried by said frame; a tool change member carried by said spindle for movement relative thereto; an indexably movable magazine carried by said frame in operative relationship with said tool change member; a plurality of tools releasably carried by said magazine; a tool positioning member secured to said frame in axial alignment with said tool change member; and power means connected to actuate said tool positioning member, said tool change member and said magazine in co-ordinated relationship whereby an interchange of tools is effected between said magazine and said spindle.

4. In a tool change mechanism; a support means; a power operated indexable tool storage means releasably carrying a plurality of tools, said storage means carried by said support means; a power driven tool receiving means carried by said support means in operative relationship with said storage means; a tool transfer means movably carried within said tool receiving means in operative relationship with said storage means; a tool repositioning means carried by said support means and adapted to release a tool from said storage means and position the tool in said tool transfer means; and power means connected to operate said storage means, repositioning means and tool receiving means, whereby a tool is transferred between said storage means and said receiving means through coordinated movements with said tool transfer means.

5. In a machine tool having a power driven tool spindle, a tool change mechanism comprising a pair of co-operatively movable tool change members, one of said members being movably supported by said spindle for movement relative to said spindle and operable to move a tool into operating position in said spindle, tool storage means connected to advance a preselected tool between the cooperating members comprising said change mechanism, and power operable control means actuatable to effect coordinate operation of the members comprising said change mechanism in their movement of tools for interchanging tools between said storage means and said spindle.

6. In a machine tool having a power driven rotatable tool receiving spindle, a releasable tool gripping member carried wholly within said spindle for movement relative to said spindle for axially moving a preselected tool to an operating position therein, and separate power driven means having a plurality of individual tools each mounted so that any one may be selected and so connected to move a preselected tool from a stored position into a position for engagement by said gripping means so that the latter may move it axially from said power driven means into the operating position within said spindle.

7. In a machine tool, a pair of tool carrying elements including a storage socket and a tool spindle carried for relative movement into predetermined spaced apart positions, a movable tool change member including gripping means bodily carried by said spindle and being movable relative to said spindle between a loading and an operating position, and separate power driven means to bodily move a tool from the predeterminately positioned storage socket into the loading position for engagement by the gripping means carried by said spindle.

8. In a machine tool having a relatively movable tool spindle and a storage magazine disposed to store tools for insertion into said spindle, said storage magazine being bodily movable in at least two mutually perpendicular planes, power operable means connected to effect bodily movement of said magazine in two planes for bodily inserting a preselected tool into an end of said spindle remote from the operating end thereof, a tool change member movably carried by said spindle for advancing a preselected inserted tool from the receiving end of said spindle to a partially projecting cutting position at the operating end thereof, and releasable securing means engageable to retain the partially projecting tool at the operating end of said spindle.

9. In a machine tool having a power driven tool spindle, a tool change mechanism comprising a pair of co-operatively movable tool change members, releasable tool grips respectively carried by said members, one of said members being movably supported by said spindle, tool storage means connected to advance a preselected tool between the cooperating members comprising said change mechanism, power operable control means actuatable to effect coordinate operation of the members comprising said change mechanism and sequential actuation of said grips for interchanging tools between said storage means and said spindle, and releasable securing means connected to secure a preselected tool in operating position in said spindle.

10. A machine tool including a spindle having a through passage providing a tool receiving end and a tool operating end, a tool transfer member having a through passage, said transfer member movably mounted within the passage of said spindle and having a clamp for clamping a tool placed therein at a point related to the receiving end of said spindle, means for moving said transfer member from the receiving end of said spindle to a tool projecting position at the operating end, and means for securing the transfer member and tool to said spindle at the operating end.

11. A machine tool according to claim 10 and including means coordinated with said transfer member for providing said transfer member with a tool.

12. A machine according to claim 11 wherein said coordinated means includes a storage of tools and means to provide a particular tool for said transfer member.

13. A machine according to claim 10 and including tool holder means adapted to provide a particular tool in alignment with said transfer member and means for pushing a tool out of said tool holder and into said transfer member.

14. A machine including a spindle having a receiving end and an operating end, a transfer member reciprocating between said ends, means for selecting any one of a plurality of tools and coordinated with said transfer member for placing the selected tool therein, and means for operating said transfer member to move the selected tool from the receiving end to the operating end of the spindle and to return the selected tool to the receiving end for removal from the spindle.

15. A spindle, means for selecting any one tool from a group of tools and presenting it to said spindle, means carried wholly by said spindle and reacting on the selected tool to position it in operating position with the tool projecting from said spindle, and means to lock the tool when so positioned.

References Cited in the file of this patent
UNITED STATES PATENTS

| | | |
|---|---|---|
| 2,883,890 | Fink | Apr. 28, 1959 |
| 2,901,927 | Morgan | Sept. 1, 1959 |
| 2,952,170 | Hansen | Sept. 13, 1960 |
| 2,997,901 | Keck | Aug. 29, 1961 |
| 3,052,011 | Brainard | Sept. 4, 1962 |
| 3,073,024 | Hutchens | Jan. 15, 1963 |
| 3,074,147 | Miller | Jan. 22, 1963 |

Disclaimer 3,133,349.—*Kurt A. Riedel*, Milwaukee, Wis. TOOL CHANGER FOR A MACHINE TOOL. Patent dated May 19, 1964. Disclaimer filed June 26, 1972, by the assignee, *Kearney & Trecker Corporation*.

Hereby enters this disclaimer to all claims of said patent.

[*Official Gazette February 19, 1974.*]